United States Patent [19]
Furcini

[11] 4,089,256
[45] May 16, 1978

[54] WIND DEFLECTOR FOR AN AUTOMOTIVE VEHICLE

[76] Inventor: James F. Furcini, 4017 N. 59th Dr., Phoenix, Ariz. 85033

[21] Appl. No.: 746,416

[22] Filed: Dec. 1, 1976

Related U.S. Application Data

[63] Continuation-in-part of Ser. No. 576,788, May 12, 1975, abandoned, and a continuation-in-part of Ser. No. 521,634, Nov. 7, 1974, abandoned.

[51] Int. Cl.² .............................................. B60J 1/20
[52] U.S. Cl. ..................................... 98/2.12; 98/2.13
[58] Field of Search ................. 98/2.12, 2.13; 296/152

[56] References Cited

U.S. PATENT DOCUMENTS

| | | | |
|---|---|---|---|
| 1,707,888 | 4/1929 | White | 98/2.13 |
| 1,855,588 | 4/1932 | Pritchard | 98/2.13 |
| 2,034,528 | 3/1936 | Oakes | 98/2.13 |
| 2,676,840 | 4/1954 | Rothweiler | 98/2.12 |
| 2,696,154 | 12/1954 | Eaton | 98/2.12 |
| 2,847,246 | 8/1958 | Caradonna | 98/2.12 |
| 2,859,680 | 11/1958 | O'Shei | 98/2.13 |
| 3,915,078 | 10/1975 | Woods, Jr. | 98/2.12 |

*Primary Examiner*—John J. Camby
*Assistant Examiner*—Henry C. Yuen
*Attorney, Agent, or Firm*—Herbert E. Haynes, Jr.

[57] ABSTRACT

A wind deflector for reducing air currents within an automotive vehicle with the deflector being mountable at the rearwardly disposed portion of the automotive vehicle's window and configured so as to leave the lower portion of the window unencumbered.

10 Claims, 7 Drawing Figures

WIND DEFLECTOR FOR AN AUTOMOTIVE VEHICLE

CROSS REFERENCE TO RELATED APPLICATION

This application is a continuation in part of copending U.S. patent application Ser. No. 576,788, filed May 12, 1975, entitled Window Deflector For An Automotive Vehicle, now abandoned, and a continuation in part of copending U.S. patent application Ser. No. 521,634, filed Nov. 7, 1974, entitled Automotive Wind Deflector, now abandoned, both by the same inventor.

BACKGROUND OF THE INVENTION

1. Field of the Invention

This invention relates to wind deflecting mechanisms, and more particularly to a wind deflector mechanism for use in the window opening of an automotive vehicle.

2. Description of the Prior Art

The air turbulence and noise produced when an automotive vehicle is operated with the windows open has long been a problem in all automotive vehicles, with that problem being particularly troublesome in the type of vehicles sometimes referred to as pickup trucks. Due to the relatively small operator compartments and large window openings of these so-called pickup trucks, a considerable amount of turbulence and noise is produced to the extent that such vehicles oftentimes cannot comfortably be operated with the windows open.

In general, several prior art devices have been devices for installation in the rearwardly disposed portions of automotive vehicle window openings with such devices being highly desirably in relatively large window openings. Many of these prior art devices have been fabricated of rigid and cumbersome materials with relatively complex fastening and adjusting hardware, and the cost and awkwardness of these prior art devices has contributed to their lack of commercial acceptance. Further, these prior art devices were designed to extend between the top and sill of the window opening and thereby interfered with the use of the window opening for giving hand signals, the use of the sill as an arm rest, and the like. Examples of this type of prior art wind deflector mechanisms may be seen in U.S. Pat. Nos. 1,968,948 and 2,242,606.

A particular prior art structure is fully disclosed, in U.S. Pat. No. 2,696,154, issued Dec. 7, 1954 to W. S. Eaton, as a deflector assembly which includes a deflecting member located in the forward portion of a vehicle's window opening and a shield member located in the rear portion of the same opening. The combination of the front deflector and rear shield cooperate to form an apparently effective deflector assembly. However, the combined area of those devices is quite large and obstruct a considerable portion of the window opening making utilization of the opening difficult at best. The shield member of the Eaton assembly bears a resemblance to the structure disclosed herein, however the configuration thereof is effective only in combination with the front deflector of the assembly. The shield member is substantially ineffective of itself in that its top edge, which attaches to the top edge of the window opening, is approximately one third the length of its rear edge, which attaches to the rear edge of the window opening. That configuration does not provide sufficient deflection surface in the upper rear corner of the window opening which has been determined as a critical area insofar as air turbulence is concerned.

In view of the foregoing, it may be seen that a need exists for a new and improved wind deflector which overcomes some of the problems and drawbacks of the prior art.

SUMMARY OF THE INVENTION

In accordance with the present invention, a new and improved wind deflector is disclosed for use in the window opening of an automotive vehicle, with the deflector being particularly suited for use in a vehicle sometimes referred to as a pickup truck. The deflector is a substantially triangularly shaped panel adapted for mounting in the upwardly and rearwardly disposed area of the window opening so as to dampen air turbulence and currents without interfering with the normal usage of the window sill as an arm rest and the window opening for giving of hand signals and the like.

The deflector of the present invention is preferably mounted inwardly with respect to the path of movement of the window glass so as not to interfere with the normal opening and closing thereof. The panel may be mounted such as by applying a suitable adhesive to the top and rear edges thereof and wedgingly inserting those edges between the metal window frame channel and the resilient channel gasket, or by the utilization of suitable clips.

It may now be apparent that the wind deflector of the present invention may be fabricated of a single piece of relatively thin gage material and does not require an elaborate frame or complex attachment hardware, and may be formed of opaque, translucent, or transparent material as desired. Further, the deflector configuration may vary somewhat within fixed perimeters and may be provided with a decorative and/or reinforcing enlarged bead on the exposed edge thereof.

Accordingly, it is an object of the present invention to provide a new and improved wind deflector for use in the window opening of an automotive vehicle.

Another object of the present invention is to provide a new and improved wind deflector for use in the window opening of a pickup truck.

Another object of the present invention is to provide a new and improved wind deflector which is simple of design, inexpensive to fabricate, and easy to install.

Another object of the present invention is to provide a new and improved wind deflector of substantially triangular configuration for mounting in the upwardly and rearwardly disposed area of an automotive vehicle's window opening for dampening air turbulence and currents without interfering with normal usage of the window opening.

Another object of the present is to provide a new and improved wind deflector for mounting in the upwardly and rearwardly disposed portion of the window opening in a pickup truck, with the deflector having a top edge which is substantially one half the length of the rear edge.

Another object of the present invention is to provide a new and improved wind deflector of the above described character which is of relatively thin gage construction so that the top and rear edges thereof may be wedgingly inserted between the metal window channel and the resilient channel gasket of the vehicle's window opening for retaining the wind deflector therein.

The foregoing and other objects of the present invention, as well as the invention itself, may be more fully

DESCRIPTION OF THE PREFERRED EMBODIMENTS

Figure 1:
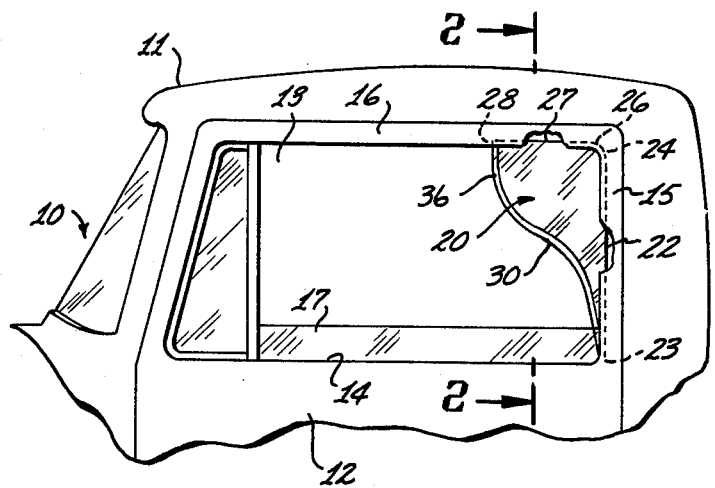
FIG. 1 is a fragmentary side elevation of an automotive vehicle having the wind deflector of the present invention installed therein.

Referring more particularly to the drawings, FIG. 1 illustrates a fragmentary portion of a typical automotive vehicle 10, in the form of a pickup truck, having the usual driver's compartment 11, door 12, and window 13. The window opening 13 includes the usual frame structure having the sill member 14, rearwardly disposed frame member 15, and top frame member 16, and in which the window glass 17 is movingly mounted as is well known in the art.

Also shown in FIG. 1 is the wind deflector of the present invention which is a substantially triangularly shaped panel indicated generally by the reference numeral 20. The wind deflector panel 20 is mounted, as will hereinafter be described in detail, so as to be positioned in the rearwardly and upwardly disposed area of the window opening 13. By positioning the wind deflector 20 in that manner, air currents which would otherwise enter into the compartment 11 will be deflected so that the air turbulence and noise usually present around the operator's head will be substantially reduced.

The wind deflector panel 20 is provided with a vertically disposed rear edge 22 having a lower end 23 and which curves at its upper end 24 to be unitary with the rearwardly disposed end 26 of the horizontally extending top edge 27. The top edge 27 extends forwardly and terminates at the forwardmost end 28. A diagonally disposed leading edge 30 extends angularly downwardly and rearwardly between the forwardmost end 28 of the top edge 27 and the lowermost end 23 of the rear edge 22 of the panel 20.

It has been found through experimentation, conducted on various models of trucks, that a majority of the air movement, turbulence and noise, resulting from normal driving with the side window open, occurs in the upper rear corner of the opening, and to a lesser degree, downwardly diminishing along the rear window frame member. Thus, if the deflector panel 20 is to be effective and yet not result in excessive window obstruction, the geometric configuration thereof must conform to specific perimeters. As hereinbefore mentioned, the panel 20 is of generally triangular configuration with the critical perimeter being that the top edge 27 must have a minimum length of approximately one half of the length of the rear edge 22, with that relationship being otherwise stated as a 2:1 ratio. Such a configuration insures that the panel 20 provides sufficient surface area in the upper rear corner of the window opening 13 and downwardly diminishing surface area extending along the rear window frame member 15.

With the wind deflector panel 20 positioned and configured as hereinbefore described, it will be noted that the window sill member 14 is not obstructed in any manner by the panel 20 and therefore that sill is not encumbered for normal usage such as for an arm rest. It will also be noted that the window opening area immediately above the window sill 14 is also not obstructed to any great extent by the panel 20 so that this area is not restricted for normal usage such as for giving hand signals.

Figures 2, 3, 4, 5, 6, 7:
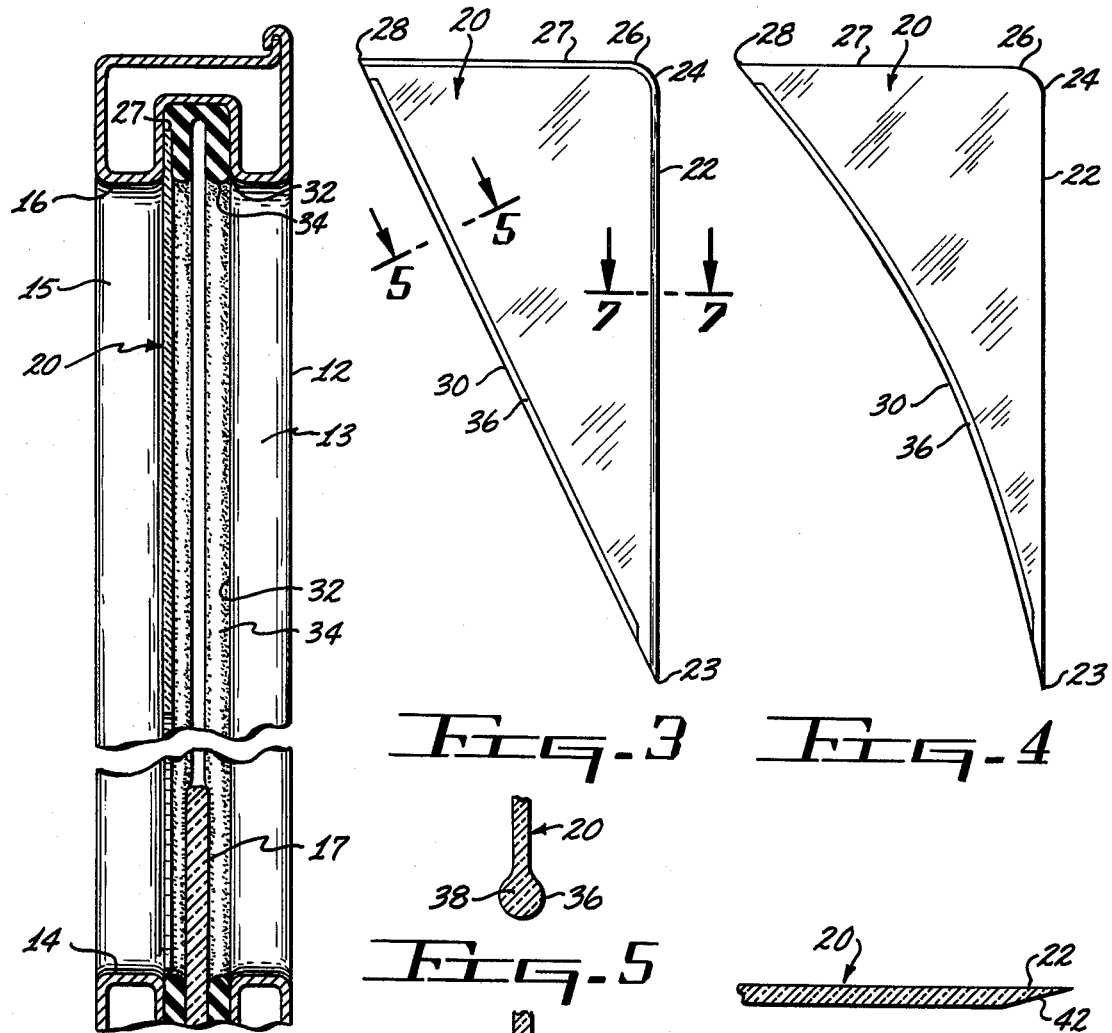
FIG. 2 is an enlarged sectional view taken on the line 2—2 of FIG. 1.
FIG. 3 is an elevational view of a modified configuration of the wind deflector of the present invention.
FIG. 4 is an elevational view of another modified configuration of the wind deflector of the present invention.
FIG. 5 is an enlarged fragmentary sectional view taken on the line 5—5 of FIG. 3.
FIG. 6 is an enlarged sectional view similar to FIG. 5 and showing a modified configuration.
FIG. 7 is an enlarged sectional view taken on the line 7—7 of FIG. 3.

FIG. 2 illustrates the preferred mounted position of the wind deflector panel 20 as being juxtapositionally spaced from the window glass 17 so as not to interfere with opening and closing of the window, and disposed inwardly with respect thereto as a deterrent to vandalism, theft, and the like.

The rear and top frame members 15 and 16 respectively, of the window frame are fabricated with the usual rigid metal channels 32 in which resilient channel gaskets 34 are suitably affixed as is customary and well known in the art. Mounting of the wind deflector panel 20 may be accomplished in any convenient manner such as with suitable clips (not shown) or by wedgingly inserting the rear and top edges 22 and 27 between the rigid channel 32 and the resilient gasket 34 of their respective rear and top frame members 15 and 16. Due to wind and vehicle vibration, it is preferred that a suitable adhesive be employed to secure the edges of the deflector panel 20 within their respective frame members.

The exact configuration of the leading edge 30 of the wind deflector panel 20 may vary somewhat as long as the basic triangular shape is maintained. FIG. 1 shows the leading edge 30 of the deflector panel 20 as being formed with an undulatory curvature. FIG. 3 shows a modified form of the deflector panel 20 as having the leading edge 30 thereof formed substantially straight. Another modified form of the wind deflector panel 20 is shown in FIG. 4 to have the leading edge thereof configured into a concave curvature.

It is preferred that the wind deflector panel 20 of the present invention be provided with a bead means 36 on the leading edge 30 thereof to rigidify the panel 20 and to blunt the leading edge 30. FIG. 5 shows the bead means 36 as a substantially rounded in cross section enlargement 38 which is molded or otherwise formed unitary with the panel 20. FIG. 6 shows the bead means 36 as being a molding strip 40 that may be cemented or otherwise suitably affixed to the leading edge 30 of the panel 20. In any event, the bead means 36 extends along the length of the leading edge 30 and, as seen best in FIGS. 3 and 4, will terminate just short of the opposite ends of the leading edge 30 so as not to hinder installation of the panel.

The deflector panel 20 may be fabricated of any suitable opaque, translucent, or transparent material with the preferred form being that a translucent or tinted synthetic material be employed such as Plexiglass or any of the other well known suitable materials sometimes referred to as plastic. The panel 20 should be formed of a relatively thin gage material so as to allow the wedged insertion of the rear and top edges 22 and 27 as hereinbefore described in detail. To facilitate insertion of the edges 22 and 27, those edges may be beveled as shown at 42 in FIG. 7 or otherwise formed with a reduced material thickness. In this manner, the thickness of the panel material need not be so thin as to result in a flimsy structure.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A wind deflector panel for use in the side window opening of a truck comprising in combination:
    a. a truck having at least one side window opening in which a window glass is movably mounted and which is defined by top and rear window frame members; and
    b. a wind deflector panel mounted within the window opening of said truck in juxtaposed parallel relationship with respect to the movement path of the window glass, said panel of generally triangular configuration and having a rear edge affixed to the rear window frame member and extending substantially along the length thereof and having a top edge affixed to the top window frame member with said top edge having a length which is one half of the length of said rear edge, said panel having a leading edge which extends between the forwardmost end of said top edge and the lowermost end of said rear edge.

2. A wind deflector panel as claimed in claim 1 and further comprising:
    a. said top and rear window frame members of said truck each include a rigid channel having a resilient channel gasket mounted therein; and
    b. said top and rear edges of said panel are configured so that said top edge is wedgingly inserted between the rigid channel and the resilient channel gasket of said top window frame member and said rear edge is wedgingly inserted between the rigid channel and the resilient channel gasket of said rear window frame member.

3. A wind deflector panel as claimed in claim 1 wherein said panel is spaced from the movement path of the window glass and is disposed inwardly therefrom into the operator's compartment of said truck.

4. A wind deflector panel as claimed in claim 1 wherein said leading edge of said panel is configured in an undulatory curvature and extends angularly rearwardly and downwardly from the forwardmost end of said top edge of said panel to the lowermost end of said rear edge thereof.

5. A wind deflector panel as claimed in claim 1 wherein said leading edge of said panel is configured in a substantially straight line and extends angularly rearwardly and downwardly from the forwardmost end of said top edge of said panel to the lowermost end of said rear edge thereof.

6. A wind deflector panel as claimed in claim 1 wherein said leading edge of said panel is configured in a concave curvature and extends angularly rearwardly and downwardly from the forwardmost end of said top edge of said panel to the lowermost end of said rear edge thereof.

7. A wind deflector panel as claimed in claim 1 wherein said leading edge of said panel is provided with a bead means thereon for rigidifying and blunting that leading edge.

8. A wind deflector panel as claimed in claim 7 wherein said bead means includes a substantially round in cross section enlargement formed integral with said panel.

9. A wind deflector panel as claimed in claim 7 wherein said bead means includes an edge molding strip affixed to said leading edge of said panel.

10. A wind deflector panel as claimed in claim 1 wherein said panel is formed of thin gage translucent material.

* * * * *